US012791860B2

(12) United States Patent
Wu et al.

(10) Patent No.: US 12,791,860 B2
(45) Date of Patent: Nov. 10, 2026

(54) SMART GLASSES COMPRISING A HOUSING HAVING AN INNER CAVITY

(71) Applicant: Beijing Unicorn Technology Co., Ltd., Beijing (CN)

(72) Inventors: Yuanyuan Wu, Beijing (CN); Yafeng Zhou, Beijing (CN); Tongfu Zhang, Beijing (CN); Yue He, Beijing (CN)

(73) Assignee: Beijing Unicorn Technology Co., Ltd., Beijing (CN)

( * ) Notice: Subject to any disclaimer, the term of this patent is extended or adjusted under 35 U.S.C. 154(b) by 232 days.

(21) Appl. No.: 18/290,803

(22) PCT Filed: Jul. 22, 2022

(86) PCT No.: PCT/CN2022/107300

§ 371 (c)(1),
(2) Date: Jan. 22, 2024

(87) PCT Pub. No.: WO2023/001271

PCT Pub. Date: Jan. 26, 2023

(65) Prior Publication Data

US 2024/0345397 A1 Oct. 17, 2024

(30) Foreign Application Priority Data

Jul. 22, 2021 (CN) ........................ 202110830677.8

(51) Int. Cl.
*G02B 27/01* (2006.01)

(52) U.S. Cl.
CPC ...... *G02B 27/0172* (2013.01); *G02B 27/0176* (2013.01); *G02B 2027/0178* (2013.01)

(58) Field of Classification Search
None
See application file for complete search history.

(56) References Cited

U.S. PATENT DOCUMENTS 6,091,546 A * 7/2000 Spitzer ............... G02B 27/0172 351/158
8,958,158 B1 2/2015 Raffle et al.
(Continued)

FOREIGN PATENT DOCUMENTS

CN 2100642 U 4/1992
CN 106773070 A 5/2017
(Continued)

OTHER PUBLICATIONS

International Search Report received in the corresponding International Application PCT/CN2022/107300, mailed Aug. 31, 2022.
(Continued)

*Primary Examiner* — Paul C Lee
(74) *Attorney, Agent, or Firm* — K&L Gates LLP

(57) ABSTRACT

The present disclosure provides smart glasses including a frame (10), an imaging system (20), and a first lens (30), wherein the imaging system (20) includes an image source assembly (21) configured to emit light for forming an image, and an optical assembly (22) configured to change an optical path of the light to project light in a direction of a first side of the image source assembly (21), the image source assembly (21) and the optical assembly (22) being both provided on the frame (10); and the first lens (30) is provided on the frame (10) and located on a second side of the image source assembly (21), with a gap being formed between the first lens (30) and the optical assembly (22), and the gap being sealed to form a sealed space. The gap between the first lens (30) and the optical assembly (22) of the smart glasses is sealed to form the sealed space, such that dust will not be deposited therein, so there is no need to disassemble them in order to clean the gap therebetween, scratches will not be produced on the first lens (30) and the optical assembly (22), and the difficulty of maintenance for a user can be reduced. Moreover, a detachable connection structure can be omitted,
(Continued)

which is beneficial to simplifying the structure of the smart glasses, and conducive to the lightness and thinness of the smart glasses, and can improve a user's wearing experience.

19 Claims, 5 Drawing Sheets

(56) References Cited

U.S. PATENT DOCUMENTS

| | | | | |
|---|---|---|---|---|
| 10,095,034 | B1 | 10/2018 | Rodriguez, II et al. | |
| 2004/0061915 | A1 * | 4/2004 | Nakamura | G02B 27/0172 359/15 |
| 2015/0168730 | A1 * | 6/2015 | Ashkenazi | G02B 27/0176 359/630 |
| 2019/0064527 | A1 * | 2/2019 | Kuo | G02B 27/0176 |

FOREIGN PATENT DOCUMENTS

| | | | | | |
|---|---|---|---|---|---|
| CN | 110603477 | A | | 12/2019 | |
| CN | 110927987 | A | | 3/2020 | |
| CN | 210181304 | U | | 3/2020 | |
| CN | 112285951 | A | | 1/2021 | |
| CN | 213240670 | U | * | 5/2021 | |
| CN | 113126304 | A | * | 7/2021 | G02B 27/0176 |
| CN | 113391453 | A | | 9/2021 | |
| CN | 216411738 | U | | 4/2022 | |
| EP | 1055952 | A2 | | 11/2000 | |
| EP | 1267197 | A2 | | 12/2002 | |
| EP | 1619534 | A2 | | 1/2006 | |
| EP | 1619534 | A3 | | 3/2006 | |
| EP | 3376279 | A1 | | 9/2018 | |
| JP | 2002107658 | A5 | | 4/2002 | |
| JP | 2006201365 | A | | 8/2006 | |
| WO | 2021057205 | A1 | | 4/2021 | |

OTHER PUBLICATIONS

Cheng Dewen et al: "Design and manufacture AR head-mounted displays: A review and outlook", Light: Advanced Manufacturing, Jan. 1, 2021 (Jan. 1, 2021), pp. 350-369, XP093005250.

The extended European search report received in the counterpart European application 22845434.4, mailed on Oct. 15, 2024.

The first Office Action received in the counterpart Chinese application 202110830677.8, mailed on Nov. 6, 2024.

* cited by examiner

SMART GLASSES COMPRISING A HOUSING HAVING AN INNER CAVITY

CROSS-REFERENCE TO RELATED PATENT APPLICATIONS

This patent application is a national phase entry under 35 USC § 371 of International Application PCT/CN2022/107300, filed on Jul. 22, 2022, which claims the benefit of and priority to Chinese Patent Application No. 202110830677.8, filed on Jul. 22, 2021. The disclosures of the aforementioned applications are hereby incorporated by reference in their entireties.

TECHNICAL FIELD

The present disclosure relates to the technical field of wearable devices, in particular to smart glasses.

BACKGROUND

Smart glasses not only require an optical assembly for adjusting an optical path, but are also usually provided with a goggle on the outer side of the optical assembly in order to protect the optical assembly and form an exterior of the glasses. Between the goggle and the optical assembly, there is usually a narrow gap, in which dust is liable to be deposited. To facilitate clearing away the dust in the gap, the goggle is generally configured to be detachably connected to a frame so that a user can remove the goggle as needed to clear away the dust in the gap during use. However, clearing away the dust increases the burden of use on the user, and as the surface of the optical assembly usually has a coating or plating layer, the optical assembly is liable to be scratched when the dust is cleared away by himself, thus seriously affecting a display effect. In addition, a detachable connection structure between the goggle and the frame increases the structural complexity of the glasses, which is not conducive to the lightness and thinness of the glasses and affects a user's wearing experience.

In the case where the goggle of the glasses is a lens with a polarization state or optical power, an optimal display effect can be achieved only if there is a suitable angle between the optical assembly and the goggle of the smart glasses. Due to the detachable connection between the goggle and the frame, the relative positions of the goggle and the frame change each time after they are connected, resulting in a change in the relative angle between the goggle and the optical assembly. Distortion or off-axis aberration occurs in the case of deviation from the above-mentioned suitable angle.

SUMMARY

The present disclosure provides smart glasses, The smart glasses includes: a frame; an imaging system including an image source configured to emit light for forming an image, and an optical assembly configured to change an optical path of the light to project light in a direction of a first side of the image source, the image source and the optical assembly being both provided on the frame; and a first lens provided on the frame and located on a second side of the image source, with a gap being formed between the first lens and the optical assembly, and the gap being sealed to form a sealed space.

DETAILED DESCRIPTION

Figure 1:
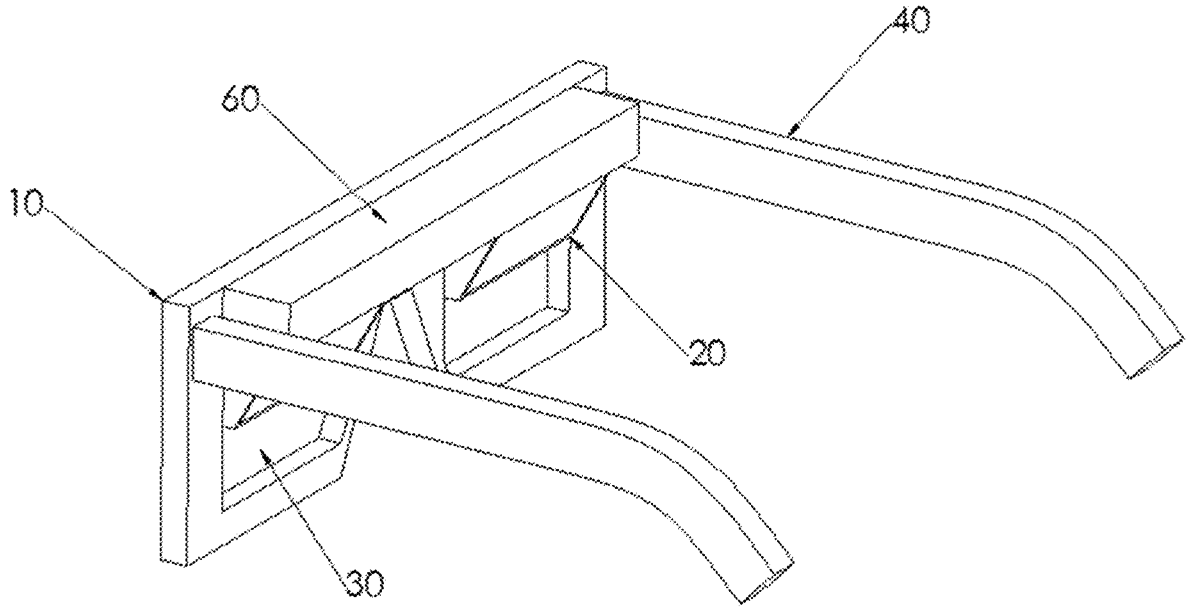
FIG. 1 is a structural diagram of an embodiment of smart glasses of the present disclosure.

Various embodiments and features of the present disclosure are described here with reference to the accompanying drawings.

The drawings included in the specification and constituting a part of the specification illustrate embodiments of the present disclosure, and together with the achieved general description of the present disclosure provided above and detailed description of embodiments given below; serve to explain the principle of the present disclosure.

These and other features of the present disclosure will become apparent from the following description of preferred forms of embodiments provided as non-limiting examples with reference to the drawings.

It should also be understood that although the present disclosure has been described with reference to specific examples, many other equivalent forms of the present disclosure can be implemented with certainty by those skilled in the art.

Specific embodiments of the present disclosure are hereinafter described with reference to the drawings; however, it should be understood that the claimed embodiments are merely examples of the present disclosure, and may be implemented in various ways. Familiar and/or repetitive functions and structures are not described in detail to avoid obscuring the present disclosure by unnecessary or redundant details. Therefore, specific structural and functional details claimed herein are not intended to be limiting, but are used merely as a basis for the claims and as a representative basis for teaching those skilled in the art to use the present disclosure in a variety of ways with substantially any suitable detailed structure.

The specification may use the phrases "in one embodiment", "in another embodiment", "in yet another embodiment" or "in other embodiments" each of which may refer to one or more of same or different embodiments according to the present disclosure.

Referring to FIGS. 1 to 8, embodiments of the present disclosure provide smart glasses, which include a frame 10, an imaging system 20, and a first lens 30.

The imaging system 20 may include an image source assembly 21 (also referred to as an image source) and an optical assembly 22. The image source assembly 21 is configured to emit light capable of forming an image. The optical assembly 22 is configured to change a path of the light emitted by the image source assembly 21 and project light toward a direction of a first side of the image source assembly 21, so that the light can be projected into a user's eye to form an image in the eye of the user when the smart glasses are worn on the head of the use. The first lens 30 is provided on the frame 10 and is located on a second side of the image source assembly 21. A gap is formed between the first lens 30 and the optical assembly 22, and the gap is sealed to form a sealed space.

In the case of the smart glasses using the above structure, the gap between the first lens 30 and the optical assembly 22 is sealed to form a sealed space. During use, dust will not be deposited in the gap between the first lens 30 and the optical assembly 22, so there is no need to disassemble them in order to clean the gap therebetween, no scratches will be produced on the first lens 30 and the optical assembly 22, and the difficulty of maintenance for a user can be reduced. Moreover, a detachable connection structure can be omitted, which is beneficial to simplifying the structure of the smart glasses, and conducive to the lightness and thinness of the smart glasses, and can improve a user's wearing experience.

Figure 4:
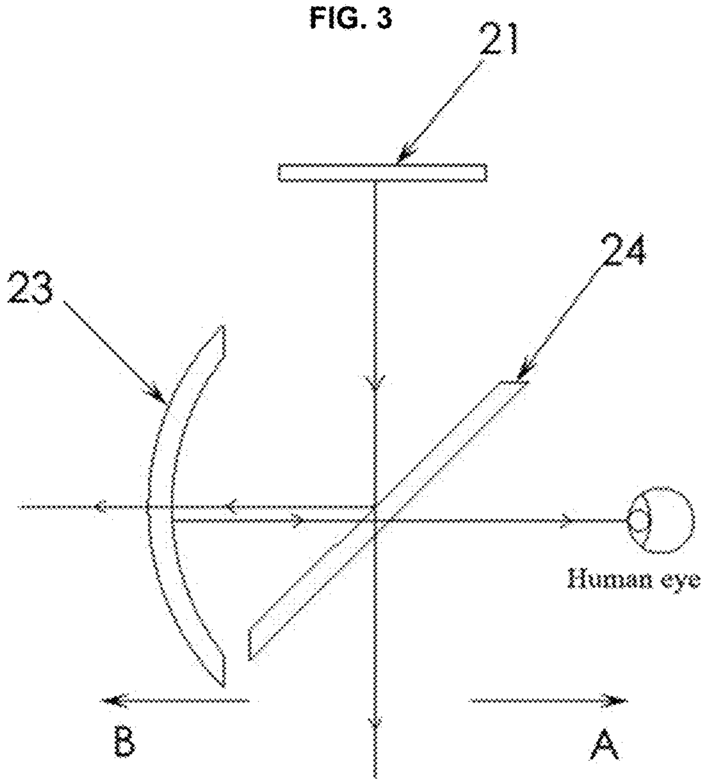
FIG. 4 is the optical schematic diagram of an imaging system.

It is to be noted that in the above and following embodiments of the present disclosure, a first side of a component is a side facing a user's eyes when the smart glasses are worn on the user's head, such as in a direction denoted by an arrow A in FIG. 4, and a second side of the component is a side opposite to the first side. That is, the second side is a side facing away from the user's eyes when the smart glasses are worn on the user's eyes, such as in a direction denoted by an arrow B in FIG. 4. Using a spectacle frame of smart glasses that includes a frame 10 and temples 40 as an example, each temple 40 is generally connected to the frame 10 at one end, and the temple 40 extends toward the first side in an unfolded state, so that the temple 40 can rest on an ear when the frame 10 is placed in front of the user's eyes.

In the present disclosure, the first lens 30 may be understood as a "goggle" of the smart glasses, and may serve as a protective lens, i.e., a lens forming an exterior of the smart glasses, and function to make the smart glasses beautiful and protect the internal structure. The frame 10 includes a portion forming an exterior of the smart glasses, and functions to support the lens of the smart glasses (a lens forming an exterior of the smart glasses) and the imaging system 20. Optionally, the first lens 30 may be a lens with a polarization state or optical power to filter polarized light or to correct a refractive error in the user's eye.

Figure 2:
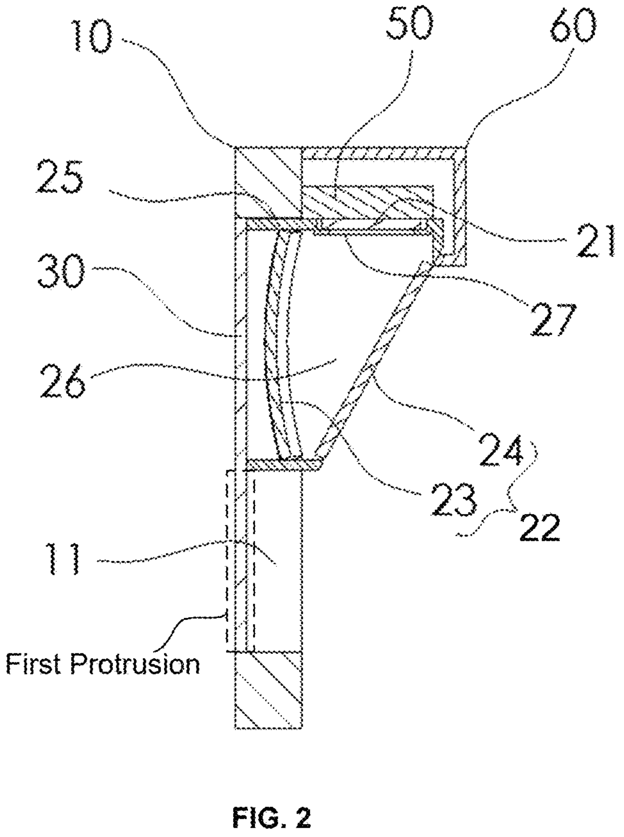
FIG. 2 is a partial cross-sectional view of achieved an embodiment of smart glasses of the present disclosure.

In conjunction with FIG. 2, in some embodiments, the imaging system 20 may further include a housing 25. The housing 25 has a first inner cavity 26 and a first end opening and a second end opening in communication with the first inner cavity. The first end opening and the second end opening are arranged opposite each other. For example, the first end opening is located on a first side of the housing 25, and the second end opening is located on a second side of the housing 25. The optical assembly 22 blocks the first end opening of the first inner cavity 26, and the first lens 30 blocks the second end opening of the first inner cavity 26 to create a sealed space in the first inner cavity 26.

The openings at two ends of the housing 25 may be defined by edge portions at the two ends defining a cavity wall of the first inner cavity 26. For example, the first end opening of the housing 25 may be defined by a first end edge portion of the cavity wall of the housing 25, and the second end opening of the housing 25 may be defined by a second end edge portion of the cavity wall. The second end edge portion adjoins the first lens 30. Sealing connection between the second end edge portion and the first lens 30 may be implemented by, for example, an adhesive layer to create a sealed space between the first lens 30 and the optical assembly 22.

In the above example, a gap between the optical assembly 22 and the first lens 30 extends through the second end of the cavity wall of the housing 25 to the first lens 30 and is in sealing connection with the first lens 10.

Optionally: the first lens 30 covers the entire cavity wall of the housing 25 and can extend beyond an outer edge of the cavity wall of the housing 25 in at least one direction. The first lens 30 extends beyond the outer edge of the cavity wall of the housing 25 in a direction away from the imaging system 20. For example, it may be that the first lens 30 extends toward a lower portion of the frame 10 of the smart glasses, to form a first protrusion beyond a lower edge of the cavity wall of the housing 25, in a direction away from a portion of the frame 10 connected to the temple 40. For example, it may be that the first lens 30 extends toward an upper portion of the frame 10 of the smart glasses to form a second protrusion beyond an upper edge of the cavity wall of the housing 25, in a direction close to a portion of the frame 10 connected to the temple 40. For example, it may be that the first lens 30 extends toward a left side of the frame 10 of the smart glasses to form a third protrusion beyond a left edge of the cavity wall of the housing 25, or that it extends toward a right side of the frame 10 of the smart glasses to form a fourth protrusion beyond a right edge of the housing 25. The left side and the right side are a side where a left temple is located and a side where a right temple is located, respectively, when the smart glasses are worn on a user's eyes.

Of course, an entire peripheral edge of the first lens 30 may extend beyond an outer peripheral edge of the cavity wall of the housing 25, and form a first protrusion, a second protrusion, a third protrusion, and a fourth protrusion, respectively. The first protrusion, the second protrusion, the third protrusion, and the fourth protrusion together form an annular region around the outer peripheral edge of the cavity wall of the housing 25. In the case where the housing 25 is provided near the top of the frame, a width of the first protrusion in a vertical direction may be significantly greater than a width of the second protrusion in the vertical direction, and widths of the third protrusion and the fourth protrusion in a transverse direction may be same or substantially same. On the one hand, the first lens 30 forms an exterior of the smart glasses. The size of the first lens 30 is larger than the size of the outer edge of the cavity wall of the housing 25, which allows the first lens 30 to be processed into various shapes without being constrained to the shape of the housing 25, resulting in a more expressive appearance of the smart glasses. On the other hand, when a user wears the smart glasses, generally the imaging system 20 corresponds to the user's eye. When the imaging system 20 displays content, it inevitably obstructs the user's field of view: The size of the first lens 30 being larger than the size of the outer edge of the cavity wall of the housing 25 allows the user to view the outside through a portion of the first lens 30 beyond the outer edge of the cavity wall of the housing 25 without being obstructed by the frame.

The frame 10 may have a lens cavity 11 running therethrough, and openings at two ends in communication with the lens cavity 11. The openings at the two ends may be a third end opening and a fourth end opening, respectively. The third end opening and the fourth end opening are arranged opposite each other. For example, the third end opening is located on a first side of the frame 10, and the fourth end opening is located on a second side of the frame

10. The third end opening may be formed on a side surface of the first side of the frame 10, and the third end opening may be defined by a third end edge portion of a cavity wall of the lens cavity 11. The fourth end opening may be formed on a side surface of the second side of the frame 10, and the fourth end opening may be defined by a fourth end edge portion of the cavity wall of the lens cavity 11. The first lens 30 may be provided at the fourth end opening of the lens cavity 11. The peripheral edge of the first lens 30 may be in sealing connection with the fourth end edge portion by, for example, an adhesive layer, thereby sealing the fourth end opening.

It may be appreciated that the thickness of the frame 10 is greater than the thickness of the first lens 30, as shown in FIG. 2. The frame 10 having a certain thickness may increase stability. An enclosure region is defined by an inner wall of the frame 10. The enclosure region may be understood as the lens cavity described above. The first lens 30 may be confined within the enclosure region of the frame, and an overall outer edge of the first lens 30 is connected to the inner wall of the frame 10. The optical assembly 22 may extend at least partially into the enclosure region, and a maximum width of the gap between the optical assembly 22 and the first lens 30 is less than the thickness of the frame 10. The design as described above may minimize the thickness of the smart glasses.

Optionally, at least part of the housing 25 may extend into the lens cavity 11 from the third end opening, and extend in the direction of the second side to the first lens 30 until the second end edge portion adjoins the first lens 30.

A sealed space is formed by at least part of the first inner cavity 26, and the sealed space can be enclosed by the housing 25, the first lens 30, and the optical assembly 22 together. The sealed space is defined without using the frame 10, for example, or other components, so the structure is simple, and manufacturing and processing are convenient. It only requires a single layer of protective lens, which is conducive to the lightness and thinness of the smart glasses to improve a user's wearing experience.

Optionally, a cushioning layer (not shown in the figures) may also be provided between the housing 25 and the first lens 30. For example, a cushioning layer may be provided between the second end edge portion of the housing 25 and the first lens 30. The cushioning layer may be formed of a flexible material such as, for example, foam or a rubber ring, to avoid failure of the seal between the housing 25 and the first lens 30 due to slight deformation therebetween.

In some embodiments, the optical assembly 22 may include a second lens 23 and a third lens 24. The second lens 23 is provided at a position in the first inner cavity 26 and close to the second end opening, to enclose the sealed space together with the housing 25 and the first lens 30. The third lens 24 is provided at the first end opening to block the first end opening. Optionally, the second lens 23 may be provided at a position in the first inner cavity 26 close to the second end opening, and the second lens 23 is opposite the first lens 30. A peripheral edge of the second lens 23 may be in sealing connection with the cavity wall of the first inner cavity 26 by, for example, an adhesive layer to seal a portion of the first inner cavity 26 located between the first lens 30 and the second lens 23 to form a sealed space. The shape of the third lens 24 may be matched with the shape of the first end opening, and a peripheral edge of the third lens 24 may be connected to the first end edge portion defining the first end opening. It may be appreciated that the second lens 23 is located inside the first inner cavity 26 of the housing 25, and the third lens 24 is located at an end of the housing 25 and forms an exterior of the smart glasses.

In some embodiments, the image source assembly 21 is provided on the housing 25 and configured to project light into the first inner cavity 26. The third lens 24 is configured to reflect the light emitted by the image source assembly 21, and the second lens 23 is configured to reflect light projected by the third lens 24 so that the light is projected through the third lens 24 toward the direction of the first side. It may be appreciated that the image source assembly 21 may project light to the third lens 24. Optionally, the housing 25 also has a side opening in communication with the first inner cavity 26. The side opening may be located between the second lens 23 and the third lens 24. The image source assembly 21 may be arranged at the side opening and project light into the first inner cavity 26 through the side opening. The side opening may be located on the top of the housing 25, and the image source assembly 21 may project light in a vertical direction. The third lens 24 projects light toward the direction of the second side after reflecting the light emitted by the image source assembly 21. The second lens 23 projects light toward the direction of the first side after reflecting the light projected by the third lens 24. The light can pass through the third lens 24 and be projected into a user's eye while the user wears the smart glasses. It is to be noted that up, down, left and right directions in embodiments of the present disclosure are based on a state of the smart glasses when they are worn on a user's head. Optionally, a portion of the housing 25 extends into the lens cavity 11, and another portion of the housing 25 extends out of the lens cavity 11. The portion of the housing 25 extending out of the lens cavity 11 is provided with a countersunk hole 27. The countersunk hole 27 forms the above-described side opening, and the image source assembly 21 is arranged in the countersunk hole 27.

In some embodiments, the smart glasses further include a support 50. The support 50 is provided on the first side of the frame 10. The support 50 may be connected to the frame 10 and the housing 25 to fix the housing 25 to the frame 10. Optionally, the support 50 is connected to a frame body of the frame 10 located on the top of the lens cavity 11, and the support 50 is connected to a top surface of the housing 25 and covers the above-described side opening to confine the image source assembly 21 within the side opening.

The smart glasses may further include a protective cover 60 arranged at least on an outer side of the supports 50. The protective cover 60 is configured to protect the support 50 and forms an exterior surface of the smart glasses. The protective cover 60 and the housing 25 together retain the image source assembly 21 and the support inside the smart glasses.

In practical applications, the smart glasses include two symmetrical parts corresponding to a user's left and right eyes, respectively: The frame 10 generally includes two lens cavities 11. Two sets of imaging systems 20 correspond to the two lens cavities 11, respectively. The housing 25 of each of the two sets of imaging systems 20 can be connected to the frame 10 by the support 50. For example, an upper edge of the protective cover 60 may be flush with an upper edge of the frame 10. The protective cover 60 not only covers the support 50 within it, but also encloses part of the housing 25. A lower edge of the protective cover 60 may extend to the first end opening of the housing 25. Two side edges of the protective cover 60 may extend to locations where the frame 10 is connected to the temple 40, or two side edges of the protective cover 60 may extend to two side edges of the frame 10. In this way, not only can the support 50, the image source assembly 21 and the housing 25 be effectively protected, but also an integral exterior surface can be formed on the smart glasses.

In assembly, the second lens 23, the third lens 24 and the image source assembly 21 are first mounted to the housing 25 to form the imaging system 20. The support 50 is connected to the housing 25 to confine the image source assembly 21 in the side opening, and adjustment and calibration are performed. The support 50 is connected to the frame 10, thereby mounting the imaging system 20 to the frame 10. The first lens 30 is mounted to the frame 10, and sealing is implemented between the first lens 30 and the housing 25 to form a sealed space between the first lens 30 and the second lens 23. The protective cover 60 is placed on the outer side of the support 50) and connected to the frame 10 and the housing 25, thus completing the assembly process.

The formation of the sealed space between the first lens 30 and the second lens 23 needs to be in a dust-free environment. It may be appreciated that the smart glasses may further include other components provided inside the protective cover 60. Such components, if introduced into a sealed space, also need to be mounted in a dust-free environment. In summary, in the embodiments of FIGS. 1 to 3, the gap between the first lens 30 and the optical assembly 22 is sealed by the first lens 30, the housing 25 of the imaging system 20, and the second lens 23 of the optical assembly 22 together. That is, the second lens 23 is provided on the housing 25, a wall of the housing 25 extends to the first lens 30 and is sealed to the first lens 30, and the second lens 23, the housing 25, and the first lens 30 together form the sealed space. Thus, the above arrangement dispenses with the installation of the above-described other components in a dust-free environment as well, and avoids an increase in the difficulty of installation.

Figure 5:
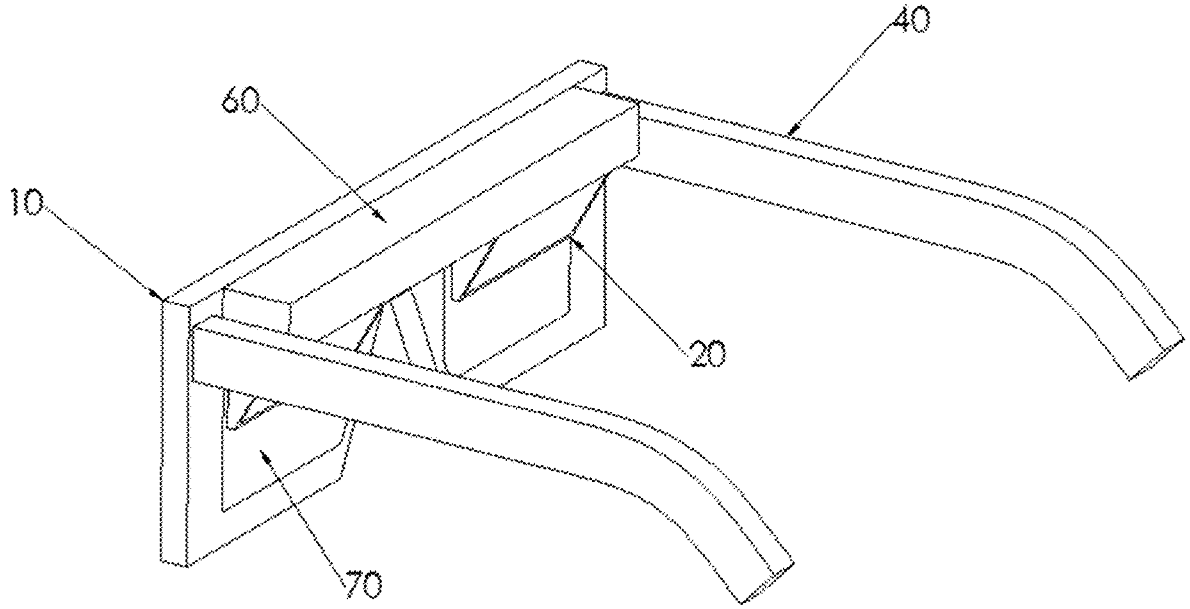
FIG. 5 is a structural diagram of another embodiment of smart glasses of the present disclosure.
Figure 6:
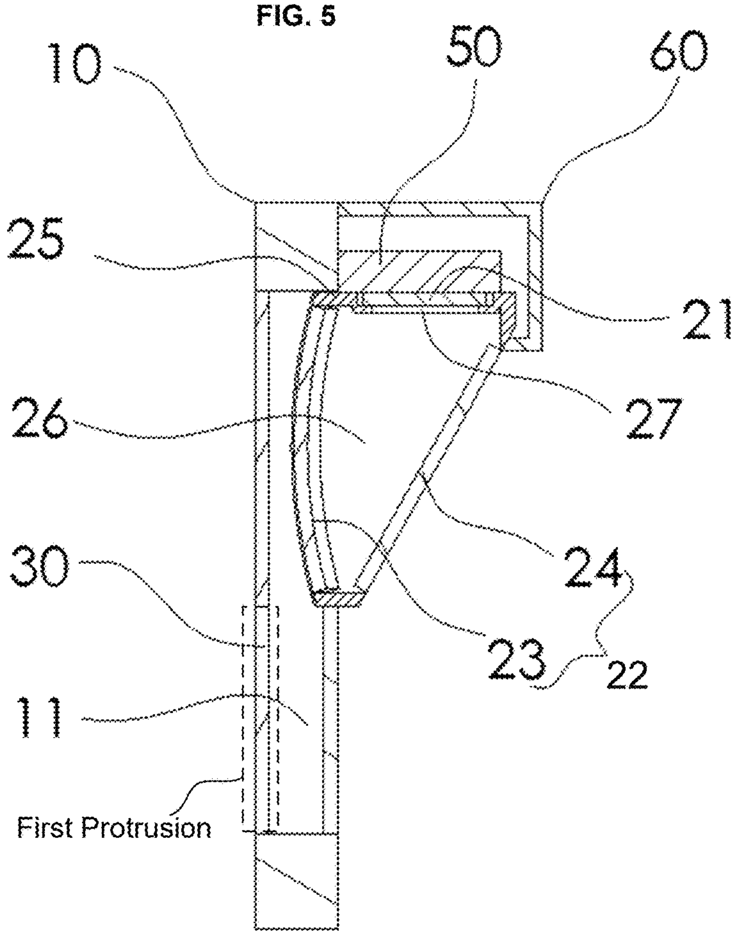
FIG. 6 is a partial cross-sectional view of another embodiment of smart glasses of the present disclosure.
Figure 7:
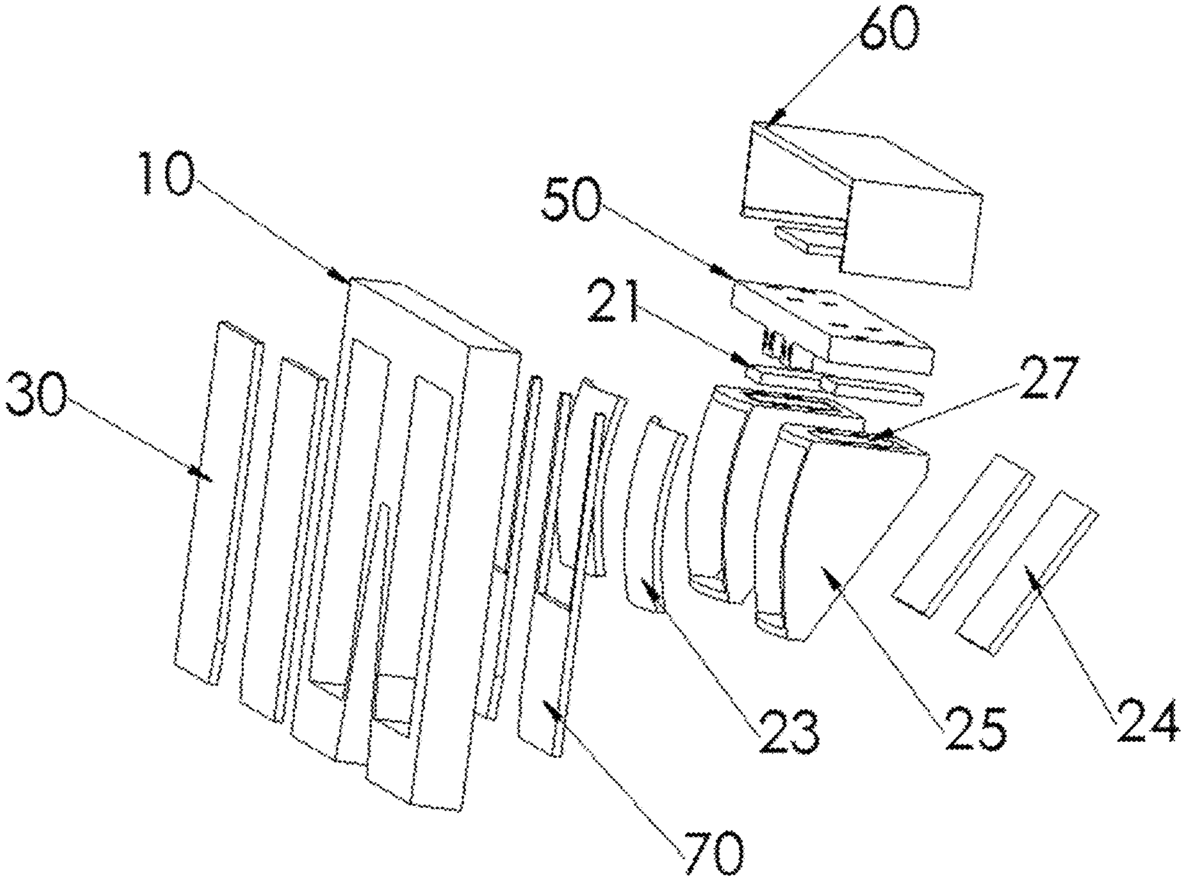
FIG. 7 is an exploded view of part of the structure of another embodiment of smart glasses of the present disclosure.

In conjunction with FIGS. 5 to 7, in some embodiments, the frame 10 has a lens cavity 11 running therethrough, and two end openings in communication with the lens cavity 11. The two end openings may be a third end opening and a fourth end opening. The third end opening and the fourth end opening are arranged opposite each other. The first lens 30 blocks the fourth end opening. The smart glasses further include a fourth lens 70 and a protective cover 60. The fourth lens 70 adjoins the imaging system 20, and both are located at the third end opening. The protective cover 60 is placed between the frame 10 and the imaging system 20 from at least a first side to block the third end opening of the lens cavity 11, together with the fourth lens 70 and the imaging system 20, to form a sealed space.

Figure 3:
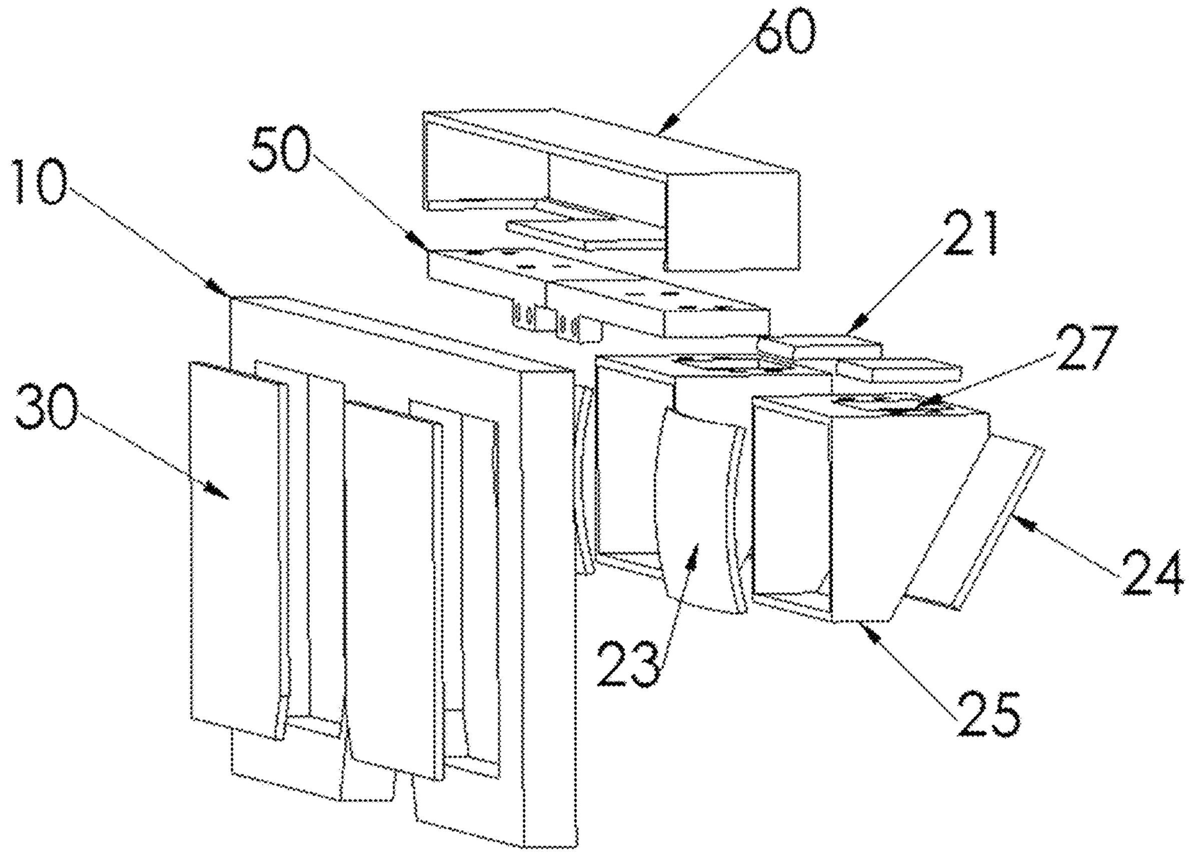
FIG. 3 is an exploded view of part of the structure of an embodiment of smart glasses of the present disclosure.

In the embodiments, for configurations of the lens cavity 11 of the frame 10, and the third end opening and the fourth end opening communicated with the lens cavity 11, as well as the first lens 30 and the fourth end opening, reference may be made to FIGS. 1 to 3, and they will not be described here. A different configuration is that the fourth lens 70 may adjoin a peripheral edge of at least one side of the imaging system 20, and a peripheral edge of the fourth lens 70 may be in sealing connection with a peripheral wall of at least one side defining the lens cavity 11. The protective cover 60 is placed at least between the frame 10 and the imaging system 20 to block a gap between the frame 10 and the imaging system 20. In this way, the third end opening of the lens cavity 11 is blocked by the fourth lens 70, the imaging system 20, and the protective cover 60 together, to form a sealed space by means of at least part of the lens cavity 11.

Optionally; a notch may be formed at an upper edge of the fourth lens 70, and the imaging system 20 may be arranged in the notch. An inner edge of the notch adjoins two side outer edges and a bottom outer edge of the imaging system 20, respectively. The upper edge of the fourth lens 70 may be flush or nearly flush with an upper edge of the imaging system 20. An outer edge of the fourth lens 70 is in sealing connection with a cavity wall defining the lens cavity 11, and the protective cover 60 may extend along a frame body of the frame 10 located on the top of the lens cavity 11 to cover the frame body of the frame 10 located on the top of the lens cavity 11, as well as part of the fourth lens 70 and part of the imaging system 20. In this way, a gap between the upper edge of the imaging system 20 and the frame 10 is sealed, thereby achieving integral sealing of the third end opening.

Optionally, the imaging system 20 may be arranged at a position close to a top wall of the lens cavity 11, and two side outer edges of the fourth lens 70 are in sealing connection with inner walls on two sides defining the lens cavity 11, respectively. An upper edge of the fourth lens 70 adjoins a lower edge of the imaging system 20, and two side outer edges of an upper portion of the fourth lens 70 are also in sealing connection with the inner walls on the two sides defining the lens cavity 11, respectively. A lower edge of the fourth lens 70 is in sealing connection with a bottom wall defining the lens cavity 11. The protective cover 60 may extend along a frame body of the frame 10 on the top of the lens cavity 11 and be placed between the imaging system 20 and the frame 10 to seal a gap between an upper edge of the imaging system 20 and the top wall of the lens cavity 11.

It is to be noted that the connection relationship between the fourth lens 70, the imaging system 20, the frame 10, and the protective cover 60 described above is only exemplary. It suffices to be able to seal the third end opening of the lens cavity 11 by mutual cooperation, thereby sealing at least part of the lens cavity 11 together with the frame 10 and the first lens 30 to form a sealed space.

In conjunction with FIGS. 6 and 7, in some embodiments, the imaging system 20 further includes a housing 25 connected to the frame 10, and the optical assembly 22 is provided on the housing 25. The fourth lens 70 is sealed to a peripheral wall of the housing 25, and the protective cover 60 is placed at least between the frame 10 and the housing 25. The protective cover 60 may be sealed to the frame 10 and the housing 25 to block the third end opening of the lens cavity 11 together with the fourth lens 70, the housing 25, and the optical assembly 22. In this way, obstruction of an optical path of the optical assembly 22 by the protective cover 60 can be avoided, which is beneficial to improving an effective area ratio of the optical assembly 22.

Optionally, the fourth lens 70 may be arranged around two side outer edges and a lower edge of the housing 25 and be in sealing connection with the two side outer edges and the lower edge of the housing 25. An upper edge of the fourth lens 70 may be flush or nearly flush with an upper edge of the housing 25, and two side outer edges of an upper portion and a lower edge of the fourth lens 70 are in sealing connection with inner walls on two sides and a bottom wall defining the lens cavity 11, respectively. The protective cover 60 may extend along a frame body of the frame 10 located on the top of the lens cavity 11, cover the frame body of the frame 10 located on the top of the lens cavity 11 from the first side, and cover part of the fourth lens 70 and the housing 25. The protective cover 60 is sealed at one end to the frame body located on the top of the lens cavity 11, and at the other end to the covered part of the housing 25 to seal a gap between the upper edge of the fourth lens 70 and a top wall of the lens cavity 11, and a gap between the upper edge of the housing 25 and the top wall of the lens cavity 11.

In another optional embodiment, the fourth lens 70 and the housing 25 may be in sealing connection. A gap may be created between a common peripheral edge of the fourth lens 70 and the housing 25 and an inner wall of the lens cavity 11. The protective cover 60 may be annular. The gap between the common peripheral edge of the fourth lens 70 and the housing 25, and the inner wall of the lens cavity 11 may all be sealed by the annular protective cover 60.

In summary; in the embodiments of FIGS. 5 to 7, the gap between the first lens 30 and the imaging system 20 is sealed on the two sides respectively as follows: on the first side, the protective cover 60, the fourth lens 70, the housing 25 of the imaging system 20, and the third lens 24 of the optics assembly 22 are used together to block the third end opening of the lens cavity 11, and on the second side, the first lens 30 is used to seal the fourth end opening of the lens cavity 11. Therefore, the second end edge portion of the second end opening of the housing 25 may be not connected to the first lens 30. The second end edge portion of the housing 25 in the embodiments is shorter than the second end edge portion of the housing 25 in the embodiments of FIGS. 1 to 3. In these embodiments, the second lens 23 of the optical assembly 22 may be provided at the second end opening of the housing 25 and block the second end opening. For other configurations of the housing 25 and configurations of the second lens 23 of the image source assembly 21 and the optical assembly 22, reference may be made to the embodiments of FIGS. 1 to 3, and they will not be described here.

In some embodiments, the smart glasses further include a support 50 provided on the first side of the frame 10 and located inside the protective cover 60. The housing 25 is connected to the frame 10 by means of the support 50. The support 50 enables the housing 25 to be securely connected to the frame 10. For configurations of the protective cover 60 and the support 50, reference may be made to the embodiments of FIGS. 1 to 3, and they will not be described here.

In assembly, the second lens 23, the third lens 24 and the image source assembly 21 are first mounted to the housing 25 to form the imaging system 20. The support 50 is connected to the housing 25 to confine the image source assembly 21 in the side opening, and adjustment and calibration are performed. The support 50 is connected to the frame 10, thereby mounting the imaging system 20 to the frame 10. The fourth lens 70 is mounted to the frame 10 and sealing is implemented both between the fourth lens 70 and the housing 25 and between the fourth lens 70 and the frame 10. The first lens 30 is mounted to the frame 10, and sealing is implemented between the first lens 30 and the housing 25 to form a sealed space within the lens cavity 11. The protective cover 60 is placed on the outer side of the support 50 and sealingly connected to the frame 10 and the housing 25, thus completing the assembly process.

Figure 8:
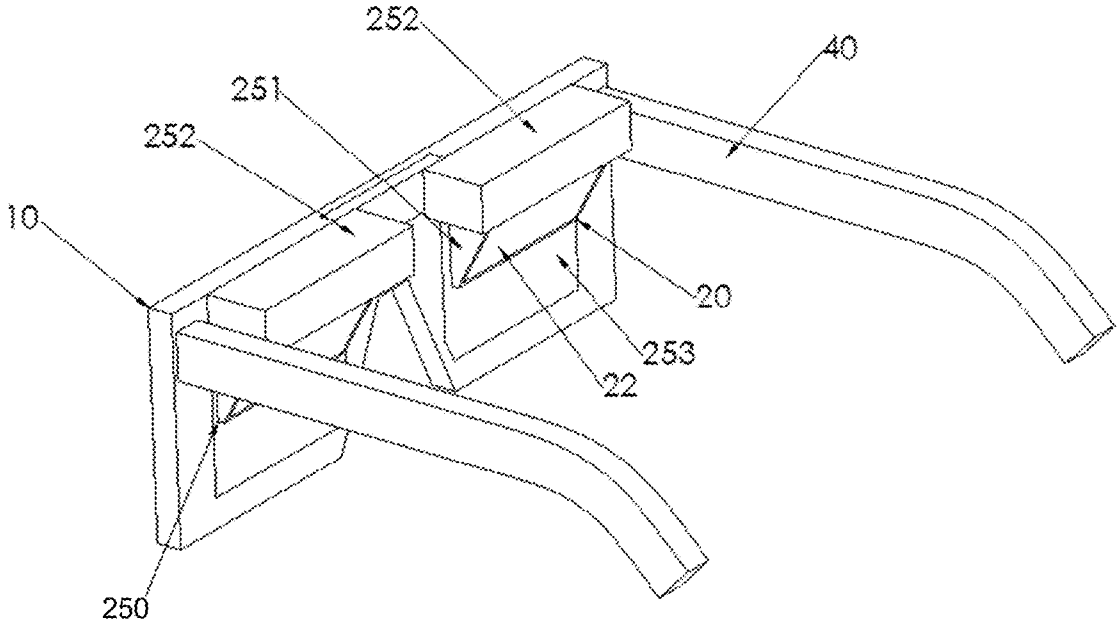
FIG. 8 is a structural diagram of yet another embodiment of smart glasses of the present disclosure.
Figure 9:
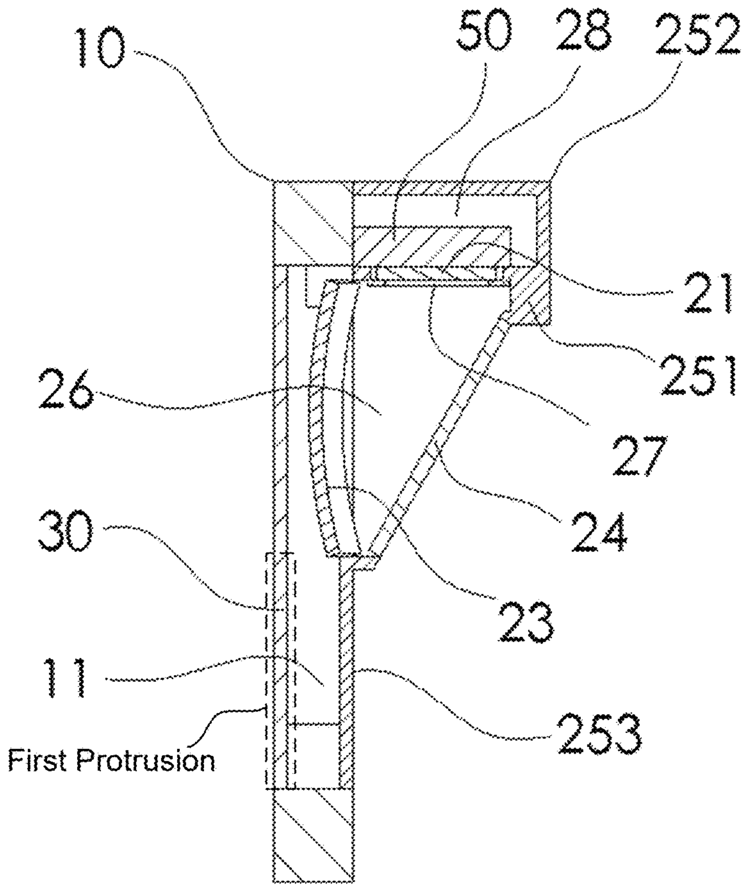
FIG. 9 is a partial cross-sectional view of yet another embodiment of smart glasses of the present disclosure.
Figure 10:
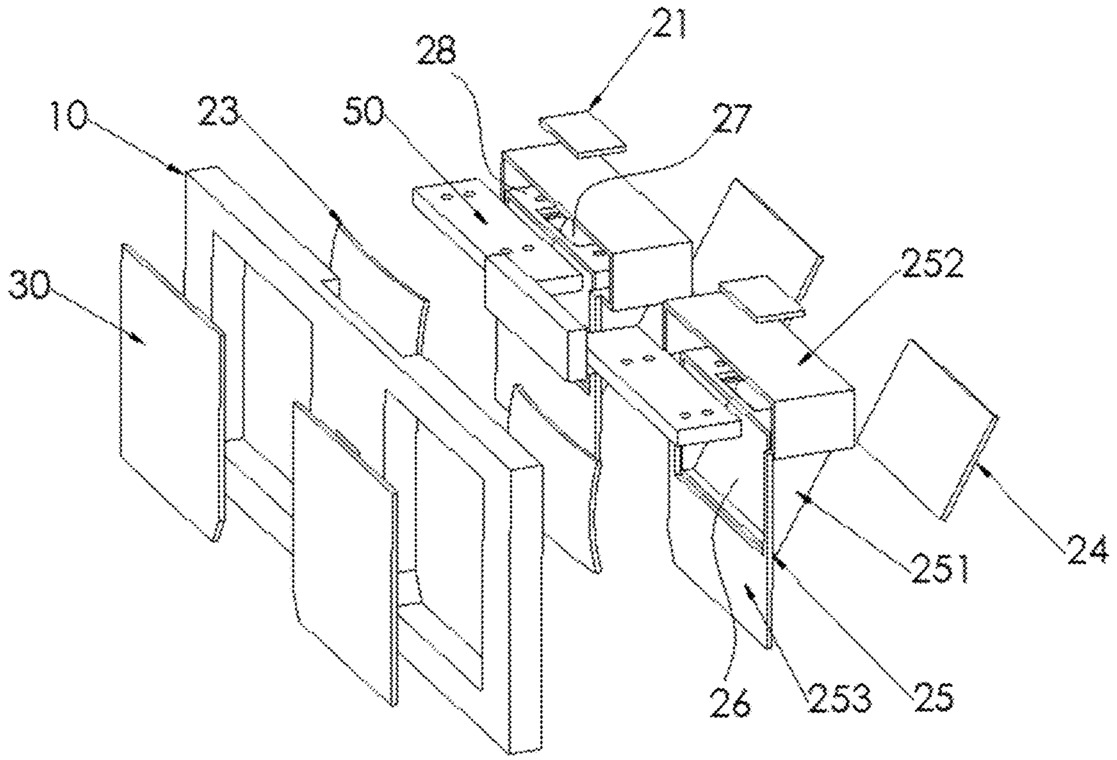
FIG. 10 is an exploded view of part of the structure of yet another embodiment of smart glasses of the present disclosure.

In conjunction with FIGS. 8 to 10, in some embodiments, the frame 10 has a lens cavity 11 running therethrough, and two end openings in communication with the lens cavity 11. The two end openings may be a third end opening and a fourth end opening. The third end opening and the fourth end opening are arranged opposite each other. The first lens 30 blocks the fourth end opening of the lens cavity 11. The imaging system 20 further includes a one-piece general housing 250. The general housing 250 includes a first housing portion 251 and a second housing portion 252. The first housing portion 251 is provided at the third end opening of the lens cavity 11, and the optical assembly 22 is provided on the first housing portion 251. The second housing portion 252 is placed between the frame 10 and the optical assembly 22 at least from a first side of the frame 10. The general housing 250 and the optical assembly 22 together block the third end opening of the lens cavity 11 to form the sealed space. In the embodiments, for configurations of the lens cavity 11 of the frame 10, and the third end opening and the fourth end opening communicated with the lens cavity 11, as well as the first lens 30 and the fourth end opening, reference may be made to the embodiments of FIGS. 1 to 3, and they will not be described here.

Optionally; the general housing 250 further includes a third housing portion 253 that can be sealingly connected to the entire third end edge portion to seal the third end opening. The second housing portion 252 and the third housing portion 253 respectively extend outwardly from two ends of the first housing portion 251. The first housing portion 251, the second housing portion 252, and the third housing portion 253 are one piece part constituting the entire general housing 250. For example, the third housing portion 253 may be sealingly connected to the third end edge portion by an adhesive layer to achieve blocking of the third end opening. An edge of at least one side of the third housing portion 253 may also extend outwardly and be sealingly connected to a side surface of the first side of the frame 10. For example, two side edges and a lower edge of the third housing portion 253 may be sealingly connected to the third end edge portion, and an upper edge of the third housing portion 253 may extend upwardly and be sealingly connected to a frame body of the frame 10 located on the top of the lens cavity 11 to achieve blocking of the third end opening. Of course, an entire peripheral edge of the third housing portion 253 may extend outwardly and be sealingly connected to the side surface of the first side of the frame 10 to achieve blocking of the third end opening.

In conjunction with FIGS. 9 and 10, in some embodiments, arrangements of the parts of the first housing portion 251 associated with the image source assembly 21 and the optical assembly 22 may be same as the arrangement of the housing 25 in the embodiments of FIGS. 1 to 3 described above, and arrangements of the image source assembly 21 and the optical assembly 22 may be same as the arrangements of the image source assembly 21 and the optical assembly 22 in the embodiments of FIGS. 1 to 3.

In some embodiments, the second housing portion 252 may also have a second inner cavity 28. The second inner cavity 28 is in communication with a first inner cavity 26 through a side opening. The image source assembly 21 may be provided in the second inner cavity 28, and the image source assembly 21 may project light into the first inner cavity 26 through the side opening. For example, the side opening may be defined in a wall between the first inner cavity 26 and the second inner cavity 28. Providing the image source assembly 21 in the second inner cavity 28 can avoid exposure of the image source assembly 21 to protect the image source assembly 21. Optionally, the second inner cavity 28 may be located on top of the first inner cavity 26, and the image source assembly 21 may project light vertically downward through the side opening to project light onto the third lens 24.

In some embodiments, the second inner cavity 28 may have a fifth end opening, and the fifth end opening is opposite the first side of the frame 10. The smart glasses further include a support 50. The support 50 extends into the second inner cavity 28 and is connected to the first housing portion 251. The support 50 is connected to the frame 10 to connect the general housing 250) to the frame 10. The support 50 enables the general housing 250 and the imaging system 20 to be securely connected to the frame 10, and an effect of hiding the support 50 can be achieved thereby.

In assembly, the second lens 23, the third lens 24 and the image source assembly 21 are first mounted to the general housing 250 to form the imaging system 20. The support 50 is connected to the general housing 250 to confine the image source assembly 21 in the side opening, and adjustment and calibration are performed. The support 50 is connected to the frame 10, thereby mounting the imaging system 20 to the frame 10. The first lens 30 is mounted to the frame 10, and sealing is implemented between the first lens 30 and the general housing 250 to form a sealed space within the lens cavity 11.

Embodiments of the present disclosure may also provide smart glasses. The smart glasses include a frame, an imaging system and a protective lens. The imaging system may include an image source configured to emit light for forming an image, an optical assembly configured to change an optical path of the light to project light in a direction of a first side of the image source, and a housing configured to support the optical assembly.

The housing may have an end facing toward a second side of the image source, and both the image source and the optical assembly are provided on the frame. The protective lens is provided on the frame and is located on the second side of the image source. A gap is formed between the protective lens and the optical assembly. An end of the housing is in sealing connection with the protective lens so that the gap is sealed to form a sealed space. The optical assembly may include a second lens and a third lens. The second lens is provided in the housing and close to the end of the housing, and defines a gap with the protective lens. The second lens, the housing and the first lens together enclose a sealed space. The third lens forms an exterior of the smart glasses and faces the direction of the first side.

The housing of the imaging system may be configured to support the optical assembly, and has a first end located on a first side of the housing and a second end located on a second side of the housing. It may be that the second end is in sealing connection with the protective lens, a portion of the second end adjacent to the image source is adjacent to an edge of the protective lens, and a portion of the second end away from the image source is adjacent to a center of the protective lens.

The above embodiments are only exemplary embodiments of the present disclosure, and are not intended to limit the present disclosure. Those skilled in the art can make various modifications or equivalent substitutions to the present disclosure within the essence and scope of protection of the present disclosure, and such modifications or equivalent substitutions should be encompassed within the scope of protection of the present disclosure.

The invention claimed is:

1. Smart glasses, comprising:

a frame;

an imaging system comprising:

an image source assembly configured to emit light for forming an image, an optical assembly configured to change an optical path of the light to project light in a direction of a first side of the image source, the image source and the optical assembly being both provided on the frame;

a housing, having a portion that forms an exterior of the smart glasses, and having a first inner cavity and a first end opening and a second end opening in communication with the first inner cavity, the first end opening and the second end opening being arranged opposite each other; and a first lens provided with a polarization state and forming an exterior of the smart glasses, and provided on the frame and located on a second side of the image source assembly, with a gap being formed between the first lens and the optical assembly, and the gap being sealed to create a sealed space, wherein the optical assembly blocks the first end opening of the first inner cavity, the first end opening of the housing is defined by a first end edge portion of a cavity wall of the housing, the second end opening of the housing is defined by a second end edge portion of the cavity wall, and the first lens extending toward a lower portion of the frame to form a first protrusion beyond the second end edge portion of the cavity wall of the housing, allowing a user to view the outside through the first protrusion of the first lens beyond an outer edge of the cavity wall of the housing.

2. The smart glasses according to claim 1, wherein the first lens blocks the second end opening of the first inner cavity to create the sealed space in the first inner cavity.

3. The smart glasses according to claim 2, wherein the optical assembly comprises:

a second lens provided at a position in the first inner cavity and close to the second end opening, to enclose the sealed space together with the housing and the first lens; and a third lens provided at the first end opening to block the first end opening.

4. The smart glasses according to claim 1, wherein the optical assembly comprises:

a second lens provided in the housing close to the end and defining the gap with the first lens, wherein the second lens, the housing and the first lens together enclose the sealed space; and a third lens forming an exterior of the smart glasses and facing the direction of the first side.

5. The smart glasses according to claim 3, wherein the image source assembly is provided on the housing and configured to project light to the third lens;

the third lens is configured to reflect the light emitted by the image source assembly; and the second lens is configured to reflect light projected by the third lens, such that the light is projected through the third lens toward the direction of the first side of the image source assembly.

6. The smart glasses according to claim 1, wherein the second end is in sealing connection with the first lens, a portion of the second end adjacent to the image source assembly is adjacent to an edge of the first lens, and a portion of the second end away from the image source assembly is adjacent to a center of the first lens.

7. The smart glasses according to claim 3, wherein the smart glasses further comprise a support provided on a first side of the frame and connected to the frame and the housing; the housing further has a side opening in communication with the first inner cavity, and the image source assembly is arranged at the side opening and projects light into the first inner cavity through the side opening; and the support covers the side opening to confine the image source in the side opening.

8. The smart glasses according to claim 7, wherein the smart glasses further comprise a protective cover arranged at least on an outer side of the support, such that the protective cover, together with the housing, retains the image source assembly and the support inside the smart glasses.

9. The smart glasses according to claim 8, wherein the frame, the first lens, the protective cover, the third lens, and the housing each have a portion that forms an exterior of the smart glasses.

10. The smart glasses according to claim 1, wherein the first lens is confined within an enclosure region defined by an inner wall of the frame, and an overall outer edge of the first lens is connected to the inner wall of the frame.

11. The smart glasses according to claim 10, wherein the optical assembly extends at least partially into the enclosure region, and a maximum width of the gap is less than the thickness of the frame.

12. The smart glasses according to claim 1, wherein the frame has a lens cavity running therethrough and a third end opening and a fourth end opening in communication with the lens cavity, the third end opening and the fourth end opening being arranged opposite each other, and the first lens blocking the fourth end opening; and the smart glasses further comprise a fourth lens in sealing connection with the housing and a protective cover, wherein the fourth lens adjoins the optical assembly, and both are located at the third end opening.

13. The smart glasses according to claim 12, wherein the fourth lens is sealed to a peripheral wall of the housing.

14. The smart glasses according to claim 1, wherein the frame has a lens cavity running therethrough, and a third end opening as well as a fourth end opening in communication with the lens cavity, the third end opening and the fourth end opening being arranged opposite to each other, and the first lens blocking the fourth end opening of the lens cavity; and the imaging system further comprises a one-piece general housing, the general housing comprising a first housing portion and a second housing portion, wherein the optical assembly is provided on the first housing portion, and the first housing portion is provided at the third end opening of the lens cavity, the second housing portion is arranged between the frame and the optical assembly at least from a first side of the frame, and the general housing and the optical assembly together block the third end opening of the lens cavity to create the sealed space.

15. Smart glasses, comprising:

a frame;

a first lens provided on the frame and forming an exterior of the smart glasses;

an imaging system comprising:

an image source assembly configured to emit light for forming an image, and an optical assembly configured to change an optical path of the light, and comprising a second lens and a third lens, the third lens forming an exterior of the smart glasses; and a housing configured to support the imaging system, the housing having a first inner cavity and a first end opening and a second end opening in communication with the first inner cavity, the first end opening and the second end opening being arranged opposite each other, wherein the optical assembly blocks the first end opening of the first inner cavity, the first end opening of the housing is defined by a first end edge portion of a cavity wall of the housing, the second end opening of the housing is defined by a second end edge portion of the cavity wall, and the first lens extending toward a lower portion of the frame to form a first protrusion beyond the second end edge portion of the cavity wall of the housing, allowing a user to view the outside through the first protrusion of the first lens beyond an outer edge of the cavity wall of the housing, wherein the second lens is arranged in the housing, and the second lens, the housing, and the first lens together enclose a sealed space.

16. The smart glasses according to claim 15, wherein the housing having an end in sealing connection with the first lens to create the sealed space.

17. Smart glasses, comprising:

a frame, an imaging system comprising:

an image source assembly configured to emit light for forming an image, an optical assembly configured to change an optical path of the light to project light in a direction of a first side of the image source assembly, and a housing configured to support the optical assembly, the housing having a first inner cavity and a first end opening and a second end opening in communication with the first inner cavity, the first end opening and the second end opening being arranged opposite each other; and a protective lens, the optical assembly, the housing and the protective lens together defining a sealed space, wherein the optical assembly blocks the first end opening of the first inner cavity, the first end opening of the housing is defined by a first end edge portion of a cavity wall of the housing, the second end opening of the housing is defined by a second end edge portion of the cavity wall, and the protective lens extending toward a lower portion of the frame to form a first protrusion beyond the second end edge portion of the cavity wall of the housing, allowing a user to view the outside through the first protrusion of the protective lens beyond an outer edge of the cavity wall of the housing.

18. The smart glasses according to claim 17, a gap is formed between the protective lens and the optical assembly, a second end edge portion of the cavity wall is in sealing connection with the protective lens to seal the gap to create the sealed space.

19. The smart glasses according to claim 18, wherein the optical assembly comprises a second lens and a third lens, the second lens is provided in the housing, close to the second end edge portion of the cavity wall, and defines the gap with the protective lens; the second lens, the housing and the protective lens together enclose the sealed space, and the third lens forms an exterior of the smart glasses.

* * * * *